United States Patent
Matsumura

(10) Patent No.: US 9,798,970 B2
(45) Date of Patent: Oct. 24, 2017

(54) RADIO FREQUENCY IDENTIFICATION TAG

(71) Applicant: FUJITSU LIMITED, Kawasaki-shi, Kanagawa (JP)

(72) Inventor: Takayoshi Matsumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/173,771

(22) Filed: Jun. 6, 2016

(65) Prior Publication Data

US 2017/0032234 A1     Feb. 2, 2017

(30) Foreign Application Priority Data

Jul. 27, 2015   (JP) .................................. 2015-147764

(51) Int. Cl.
    *G08B 13/14*   (2006.01)
    *G06K 19/077*  (2006.01)

(52) U.S. Cl.
    CPC ..... *G06K 19/0779* (2013.01); *G06K 19/0775* (2013.01); *G06K 19/07798* (2013.01)

(58) Field of Classification Search
    CPC ........... G06K 19/027; G06K 19/07722; G06K 19/07728; G06K 19/07749; G06K 19/07758; G06K 19/0775; G06K 19/0779; G06K 19/07798; G08B 13/2445
    USPC ......................................... 340/572.7, 572.1
    See application file for complete search history.

(56) References Cited

U.S. PATENT DOCUMENTS

| | | | |
|---|---|---|---|
| 7,786,873 B2* | 8/2010 | Baba ................ | G06K 19/07728 340/572.7 |
| 2007/0075148 A1 | 4/2007 | Usami | |
| 2008/0204196 A1* | 8/2008 | Baba ................ | G06K 19/07728 340/10.1 |
| 2010/0001387 A1* | 1/2010 | Kobayashi .......... | G06K 19/077 257/679 |
| 2012/0273577 A1* | 11/2012 | Kim ................. | G06K 19/07722 235/488 |
| 2013/0277433 A1 | 10/2013 | Baba et al. | |

FOREIGN PATENT DOCUMENTS

| | | |
|---|---|---|
| JP | 2007-101285 | 4/2007 |
| JP | 2013-222411 | 10/2013 |

* cited by examiner

*Primary Examiner* — Thomas Mullen

(74) *Attorney, Agent, or Firm* — Fujitsu Patent Center

(57) ABSTRACT

A radio frequency identification (RFID) tag, includes: a substrate; an antenna formed on a first surface of the substrate; an IC chip electrically coupled to the antenna; an adhesive applied to a first area of the substrate to fix the IC chip and the antenna to each other, and a first laminate layer formed on a second surface of the substrate opposite to the first surface thereof, wherein at least a part of the first laminate layer is missing within a second area, which corresponds to the first area, on the second surface.

14 Claims, 20 Drawing Sheets

RADIO FREQUENCY IDENTIFICATION TAG

CROSS-REFERENCE TO RELATED APPLICATION

This application is based upon and claims the benefit of priority of the prior Japanese Patent Application No. 2015-147764, filed on Jul. 27, 2015, the entire contents of which are incorporated herein by reference.

FIELD

The embodiments discussed herein are related to a radio frequency identification (RFID) tag.

BACKGROUND

An RFID tag includes an integrated circuit (IC) chip and an antenna, in which the IC chip operates by electromagnetic waves received through the antenna. The IC chip includes a memory that stores, for example, specific ID information in the RFID tag, and the ID information may be used for management of an article to which the RFID tag is adhered or the like. The IC chip and the antenna of the RFID tag are sealed and protected by an exterior material.

Recently, the RFID tag has been adhered to various objects to be managed. The RFID tag has been also adhered to objects to be managed and washed such as, for example, suits which include, for example, uniforms that employees in lodging facilities or amusement facilities wear, sheets, and pillow covers. In this case, the objects to be managed (e.g., suits, sheets, and pillow covers) are formed of a flexible material such as, for example, fabric and required to provide a soft touch when a person touches the RFID tag as in a case where a person touches, for example, fabric. For this reason, an RFID tag having elasticity is used. Such an RFID tag may be sewn on, for example, a cloth or a sheet or may be inserted into or adhered to, for example, a pocket with a flap.

The objects to be managed and washed are sent from, for example, multiple requesting parties to a large-scale laundry plant to be subject to the processes such as, for example, washing, drying, ironing, and folding of the laundry, and then, delivered to respective requesting customers such as lodging facilities or amusement facilities, based on the ID information stored in the RFID tag. Especially, in a drying process which performs, for example, 60-bar pressure drying or an ironing process which uses a roll iron, a large load is applied to an object to be managed such as, for example, a sheet from the outside so as to deform the RFID tag. Thus, these processes are harsh environments for the RFID tag. The deformation of the RFID tag includes, for example, bending, warping, twisting, tension, and compression.

As an example of the RFID tag, an area on a substrate having elasticity is coated with an adhesive harder than the substrate, and the IC chip is adhered to the area of the adhesive. The antenna of the RFID tag is electrically coupled to the IC chip by the adhesive. Even when the RFID tag is deformed by a load applied from the outside, the area of the adhesive is hardly deformed so that the IC chip adhered onto the area may be protected. However, the substrate is deformed at the edge of the area of the adhesive as a result of the deformation of the RFID tag. Accordingly, a tensile stress is applied to the surface of the antenna, and the deformation of the RFID tag is repeated so that the antenna may be broken at the edge of the area of the adhesive.

Conventionally, when the RFID tag is deformed, the antenna may be broken at the edge of the adhesive area on the substrate.

The followings are reference documents.
[Document 1] Japanese Laid-Open Patent Publication No. 2013-222411 and
[Document 2] Japanese Laid-Open Patent Publication No. 2007-101285.

SUMMARY

According to an aspect of the invention, a radio frequency identification (RFID) tag, includes: a substrate; an antenna formed on a first surface of the substrate; an IC chip electrically coupled to the antenna; an adhesive applied to a first area of the substrate to fix the IC chip and the antenna to each other, and a first laminate layer formed on a second surface of the substrate opposite to the first surface thereof, wherein at least a part of the first laminate layer is missing within a second area, which corresponds to the first area, on the second surface.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

In the RFID tag described herein, an adhesive, which is applied to a first area on an antenna formed on a first surface of a substrate, fixes an IC chip and the antenna to each other. In addition, a laminate layer is partially missing or does not exist within a second area, which corresponds to the first area, on a second surface of the substrate opposite to the first surface thereof.

Hereinafter, embodiments of the RFID tag will be described with reference to the drawings.

Embodiments

In the following descriptions, each drawing schematically illustrates the RFID tag, and, for example, the thickness of each layer and the dimension of each unit are not proportional to actual thickness and dimension thereof and are illustrated to be easily viewed.

Figure 1:
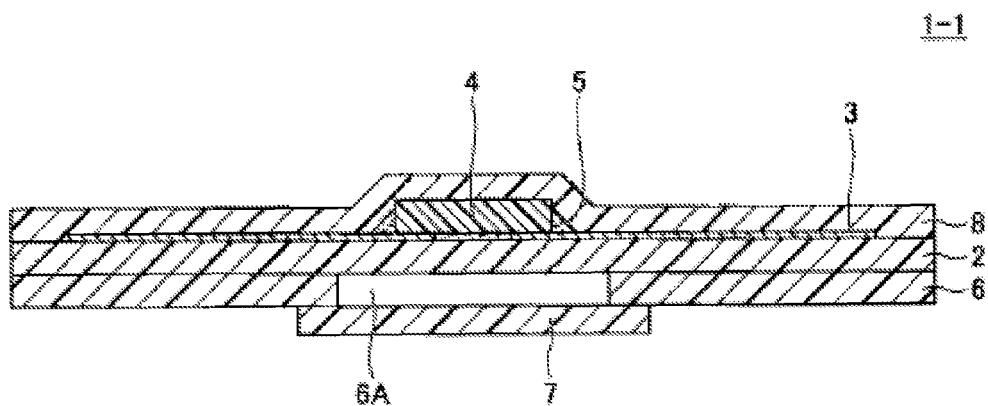
FIG. 1 is a cross-sectional view illustrating a part of an RFID tag in a first embodiment.

FIG. 1 is a cross-sectional view illustrating a part of an RFID tag in a first embodiment. In FIG. 1, an RFID tag 1-1 includes a substrate 2, an antenna 3 provided on the top surface of the substrate 2 in FIG. 1, which is an example of a first surface of the substrate 2, an IC chip 4 electrically coupled to the antenna 3, and an adhesive 5 to be applied to a first area 3A on an antenna 3, which will be described later, so as to fix the IC chip 4 and the antenna 3 to each other. The first area 3A corresponds to an adhesion area in the perspective plan view of FIG. 3 or FIG. 5 to be described later and includes the area of the top surface of the antenna 3 and the area of the top surface of the substrate 2 in a state of being provided with no antenna 3. In this example, the planar area of the IC chip 4 is smaller than the planar area of the first area 3A.

The RFID tag 1-1 further includes a first laminate layer 6 formed on the bottom surface of the substrate 2 in FIG. 1, which is an example of a second surface of the substrate 2, a first protecting layer 7 formed on the bottom surface of the first laminate layer 6, and a second laminate layer 8 formed on the top surface of the substrate 2 and configured to cover the antenna 3 and the IC chip 4. At least a part of the first laminate layer 6 is missing within a second area 2A (to be described later), which corresponds to the first area 3A, on the bottom surface of the substrate 2. The second area 2A includes at least the first area 3A in the perspective plan view of FIG. 3 or FIG. 5 to be described later.

The substrate 2 is formed of an insulating material such as, for example, polyethylene terephthalate (PET), polyethylene naphthalate (PEN), polyimide (PI), polypropylene (PP), or polyphenylene sulfide (PPS). The antenna 3 has a pattern of a conductive film formed of, for example, a metal. The IC chip has a known configuration provided with at least a memory and a transmission unit or a transmission and reception unit. The adhesive 5 may be a known conductive adhesive which contains conductive particles each having a particle diameter of, for example, several μm and has a function to electrically connect the IC chip 4 to the antenna 3 by the conductive particles of the adhesive 5 through a bump formed on the bottom surface of the IC chip 4 (not illustrated) when the bump is pressed to the antenna 3 through the adhesive 5. The adhesive 5 also includes a function to adhere and fix the IC chip to the first area 3A on the top surface of the antenna 3.

The first laminate layer 6 and the second laminate layer 8 are formed of an insulating material having elasticity such as, for example, PET, PEN, PI, PP, and PPS. The first laminate layer 6 and the second laminate layer 8 may be formed of the same insulating material or different insulating materials. The second laminate layer 8 may be thicker than the first laminate layer 6 from the viewpoint of suppressing a breakage of the antenna 3 to be described later.

At least a part of the first laminate layer 6 is missing within the second area 2A, which corresponds to the first area 3A, on the bottom surface of the substrate 2. When at least a part of the first laminate layer 6 is missing, for example, a plurality of holes or slits may be formed in the first laminate layer 6 within the second area 2A. In addition, FIG. 1 illustrates an example where the first laminate layer 6 does not exist within the second area 2A, and an opening 6A is formed therein. In this example, the opening 6A of the first laminate layer 6 forms a space enclosed by the substrate 2 and the first protecting layer 7. In addition, when a plurality of holes, slits, or the like are formed in the first laminate layer 6 within the second area 2A, the opening 6A is formed as a plurality of holes, slits or the like.

The first protecting layer 7 has a larger planar area than that of the second area 2A and may be formed of the same material as that of any one of the substrate 2, the first laminate layer 6, and the second laminate layer 8. In this case, the first protecting layer 7 may be thicker than the first laminate layer 6 from the viewpoint of suppressing the breakage of the antenna 3 to be described later. The first protecting layer 7 also has a function to protect the IC chip 4. The first protecting layer 7 may be formed of a harder material than those of the substrate 2, the first laminate layer 6, and the second laminate layer 8. The first protecting layer 7 may be omitted.

As in a sixth embodiment to be described later along with FIG. 8, a second protecting layer 17 may be formed on the top surface of the second laminate layer 8. In this case, the second protecting layer 17 has the larger planar area than that of the first area 3A and is configured to cover the first area 3A on the second laminate layer 8. The second protecting layer 17 may be formed of the same material as that of any one of the substrate 2, the first laminate layer 6, and the second laminate layer 8. In this case, the second protecting layer 17 may be thicker than the second laminate layer 8 from the viewpoint of suppressing the breakage of the antenna 3 to be described later. The second protecting layer 17 also has a function to protect the IC chip 4. The second protecting layer 17 may be formed of a harder material than those of the substrate 2, the first laminate layer 6, and the second laminate layer 8.

Figure 2:
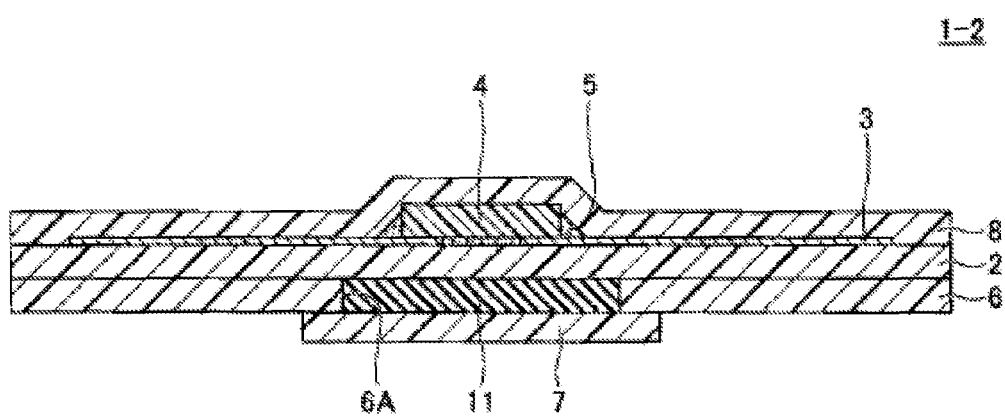
FIG. 2 is a cross-sectional view illustrating a part of an RFID tag in a second embodiment.
Figure 3:
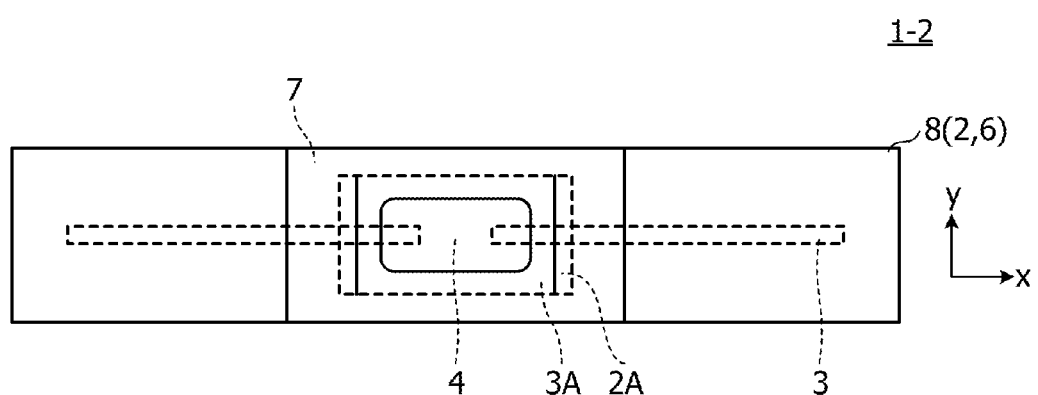
FIG. 3 is a perspective plan view illustrating a part of the RFID tag in the second embodiment.
Figure 5:
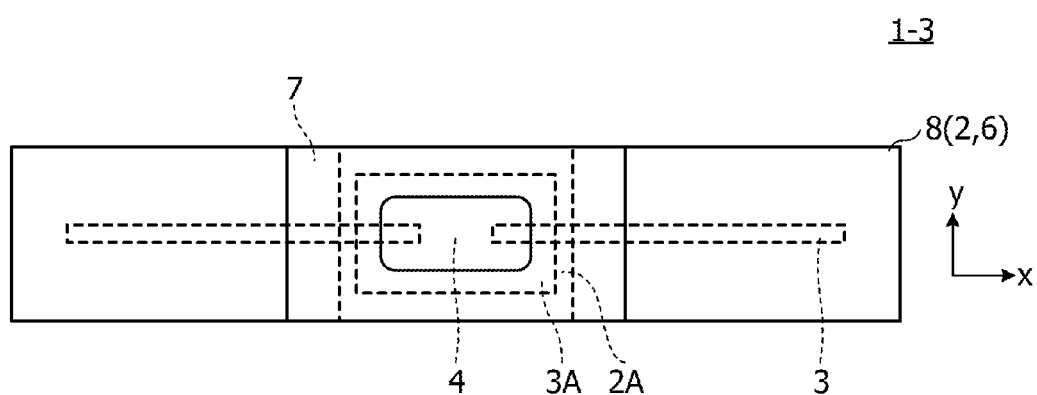
FIG. 5 is a perspective plan view illustrating a part of the RFID tag in the third embodiment.
Figure 20:
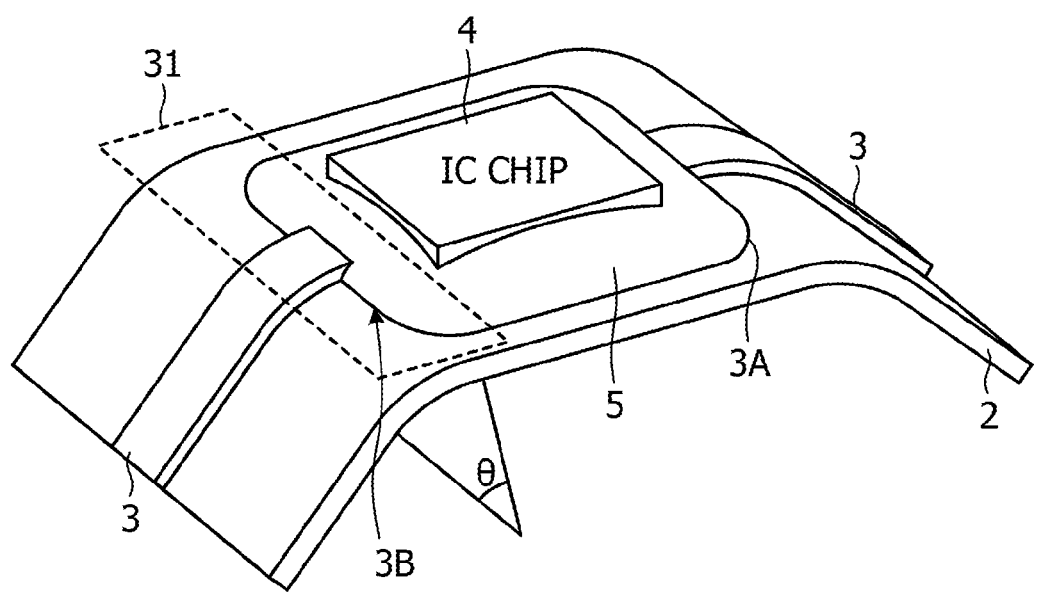
FIG. 20 is a perspective view illustrating a state in which a tensile stress is applied to a surface of an antenna at an edge of the adhesion area as a result of a deformation of an RFID tag.

FIG. 2 is a cross-sectional view illustrating a part of an RFID tag in a second embodiment. FIG. 3 is a perspective plan view illustrating a part of the RFID tag in the second embodiment. In FIGS. 2 and 3, components which are identical to those in FIG. 1 will be denoted by the same reference numerals as used in FIG. 1, and descriptions thereof will be omitted. In this example, the opening 6A of the first laminate layer 6 of an RFID tag 1-2 is filled with a rubber 11 as an example of an elastic material. In addition, the planar area of the second area 2A is the same as the planar area of the first area 3A. That is, in view of first and second directions along two adjacent sides of the IC chip 4, the length of the second area 2A in the first direction (e.g., the y-axis direction in FIG. 3) is the same as the length of the first area 3A in the first direction. The width of the second area 2A in the second direction (e.g., the x-axis direction in FIG. 3) is the same as the width of the first area 3A in the second direction. In this example, the planar shape of each of the IC chip 4, the first area 3A, and the second area 2A is substantially a rectangle and is also substantially a rectangle in the perspective plan view illustrated in FIG. 3. FIGS. 3, 5, and 20 to be described later illustrate the pattern of the conductive film forming the antenna 3 in a simplified form for convenience of explanation.

In addition, when a part of the first laminate layer 6 is missing within the second area 2A, the portion where the first laminate layer 6 is missing may be filled with the rubber 11. When, for example, a plurality of holes or slits is formed in the first laminate layer 6 within the second area 2A, the plurality of holes or slits may be filled with the rubber 11.

Figure 4:
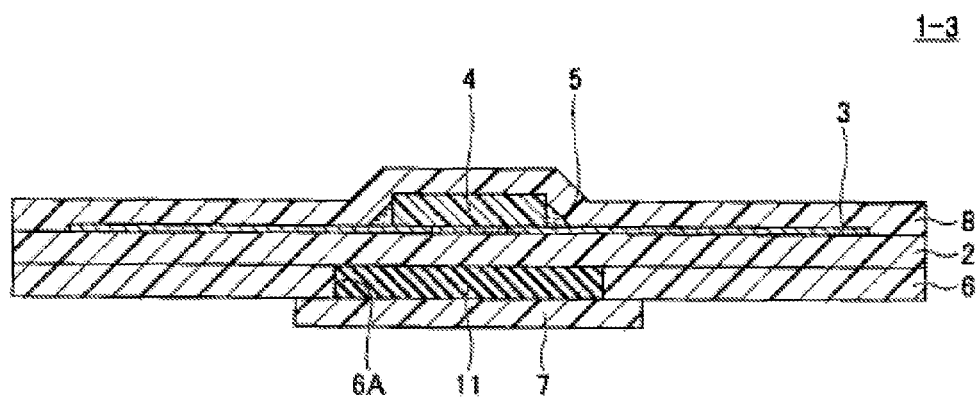
FIG. 4 is a cross-sectional view illustrating a part of an RFID tag in a third embodiment.

FIG. 4 is a cross-sectional view illustrating a part of an RFID tag in a third embodiment. FIG. 5 is a perspective plan view illustrating a part of the RFID tag in the third embodiment. In FIGS. 4 and 5, components which are identical to those in FIG. 2 will be denoted by the same reference numerals as used in FIG. 2, and descriptions thereof will be omitted. In this example, the opening 6A of the first laminate layer 6 of an RFID tag 1-3 is filled with the rubber 11 as an example of an elastic material. In addition, the second area 2A is larger than the first area 3A. That is, in this example, the planar shape of the IC chip 4 is a rectangle, in which in view of first and second directions along two adjacent sides of the rectangle, the length of the second area 2A in the first direction (e.g., the y axis direction in FIG. 5) is longer than the length of the first area 3A in the first direction, and the width of the second area 2A in the second direction (e.g., the x axis direction in FIG. 5) is the same as the width of the first area 3A in the second direction. In this example, the planar shape of each of the IC chip 4, the first area 3A, and the second area 2A is substantially a rectangle and is also substantially a rectangle in the perspective plan view illustrated in FIG. 5.

In FIG. 5, since the length of the second area 2A in the first direction (e.g., the y axis direction in FIG. 5) is the same as the length of the first laminate layer 6 in the first direction, the first laminate layer 6A is divided into two laminate layer portions by the opening 6A. In addition, the width of the second area 2A in the second direction (e.g., the x axis direction in FIG. 5) may be made larger than the width of the first area 3A in the second direction.

Figure 6:
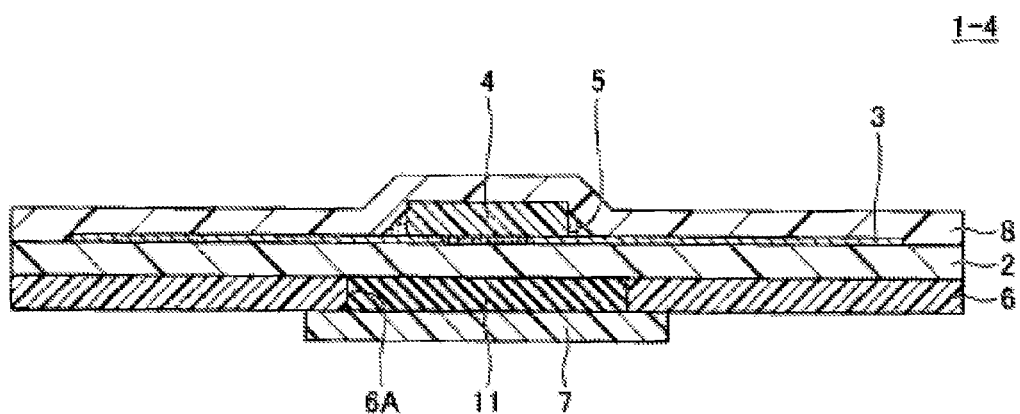
FIG. 6 is a cross-sectional view illustrating a part of an RFID tag in a fourth embodiment.

FIG. 6 is a cross-sectional view illustrating a part of an RFID tag in a fourth embodiment. In FIG. 6, components which are identical to those in FIGS. 2 to 5 will be denoted by the same reference numerals as used in FIGS. 2 to 5, and descriptions thereof will be omitted. In this example, the configuration is the same as that in FIGS. 2 and 3 or FIGS. 4 and 5, except that the substrate 2, the first laminate layer 6, the second laminate layer, and the first protecting layer 7 of an RFID tag 1-4 are formed of different insulating materials from each other. As in the sixth embodiment to be described later along with FIG. 8, the second protecting layer 17 may be formed on the top surface of the second laminate layer 8. In this case, the second protecting layer 17 may be formed of a different insulating material from those of the substrate 2, the first laminate layer 6, and the second laminate layer 8, but may be formed of the same insulating material as that of the first protecting layer 7.

Figure 7:
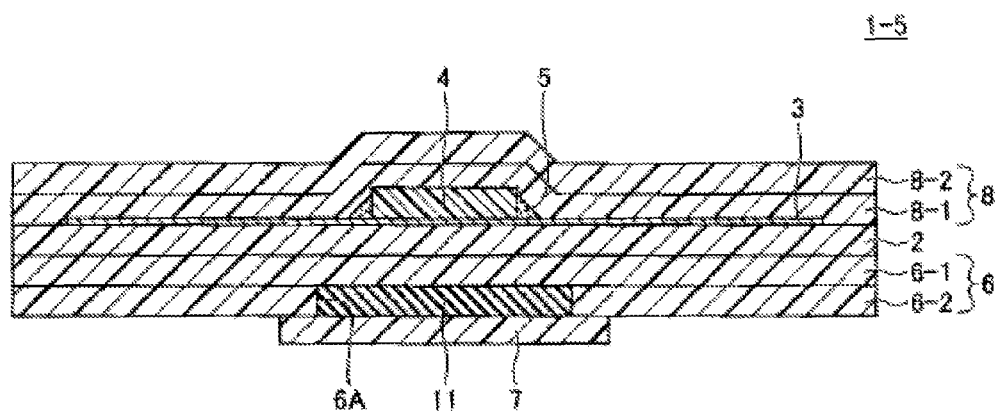
FIG. 7 is a cross-sectional view illustrating a part of an RFID tag in a fifth embodiment.

FIG. 7 is a cross-sectional view illustrating a part of an RFID tag in a fifth embodiment. In FIG. 7, components which are identical to those in FIG. 2 will be denoted by the same reference numerals as used in FIG. 2, and descriptions thereof will be omitted. In this example, the first laminate layer 6 of an RFID tag 1-5 is formed as a plurality of laminate layers 6-1 and 6-2 (two layers in the present example), and the second laminate layer 8 of the same are formed as a plurality of laminate layers 8-1 and 8-2 (two layers in the present example). The opening 6A is formed in the lower laminate layer 6-2 of the first laminate layer 6. In addition, only one of the first laminate layer 6 and the second laminate layer 8 may be formed as a plurality of laminate layers.

Figure 8:
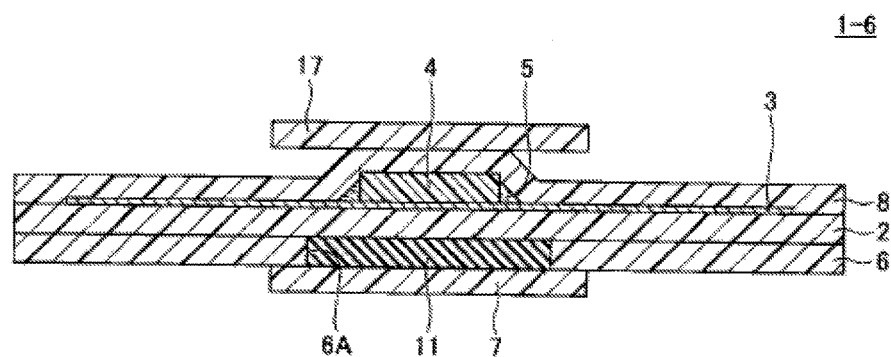
FIG. 8 is a cross-sectional view illustrating a part of an RFID tag in a sixth embodiment.

FIG. 8 is a cross-sectional view illustrating a part of an RFID tag in a sixth embodiment. In FIG. 8, components which are identical to those in FIG. 2 will be denoted by the same reference numerals as used in FIG. 2, and descriptions thereof will be omitted. In this example, the second protecting layer 17 is formed on the top surface of the second laminate layer 8 of an RFID tag 1-6. In this case, the second protecting layer 17 has a larger planar area than that of the first area 3A and is configured to cover the first area 3A on the second laminate layer 8. The second protecting layer 17 may be formed of the same material as that of any one of the substrate 2, the first laminate layer 6, and the second laminate layer 8. In this case, the second protecting layer 17 may be thicker than the second laminate layer 8 from the viewpoint of suppressing the breakage of the antenna 3 to be described later. The second protecting layer 17 also has a function to protect the IC chip 4. The second protecting layer 17 may be formed of a harder material than those of the substrate 2, the first laminate layer 6, and the second laminate layer 8. The planar area of the second protecting layer 17 may be identical to or different from the planar area of the first protecting layer 7. In addition, the first protecting layer 7 may be omitted, and only the second protecting layer 17 may be formed. However, when both the first protecting layer 7 and the second protecting layer 17 are formed, the function to protect the IC chip 4 is further improved, compared to when only one of the first protecting layer 7 and the second protecting layer 17 is formed.

Although not illustrated in FIGS. 1 to 8, the structure illustrated in each of the drawings is sealed by an exterior material having elasticity. The RFID tags 1-1 to 1-6 are protected from, for example, a pressure, heat, and water by the above-described structure of the exterior material and the RFID tags 1-1 to 1-6. An example of the exterior material will be described later along with FIGS. 11 and 12.

FIGS. 9 to 12 are cross-sectional views illustrating a manufacturing process of the RFID tag in the second embodiment. In FIGS. 9 to 12, components which are identical to those in FIG. 2 will be denoted by the same reference numerals as used in FIG. 2, and descriptions thereof will be omitted. In addition, it is natural that the RFID tags in the first and third to sixth embodiments may be manufactured by the processes of FIGS. 9 to 12.

Figure 9:
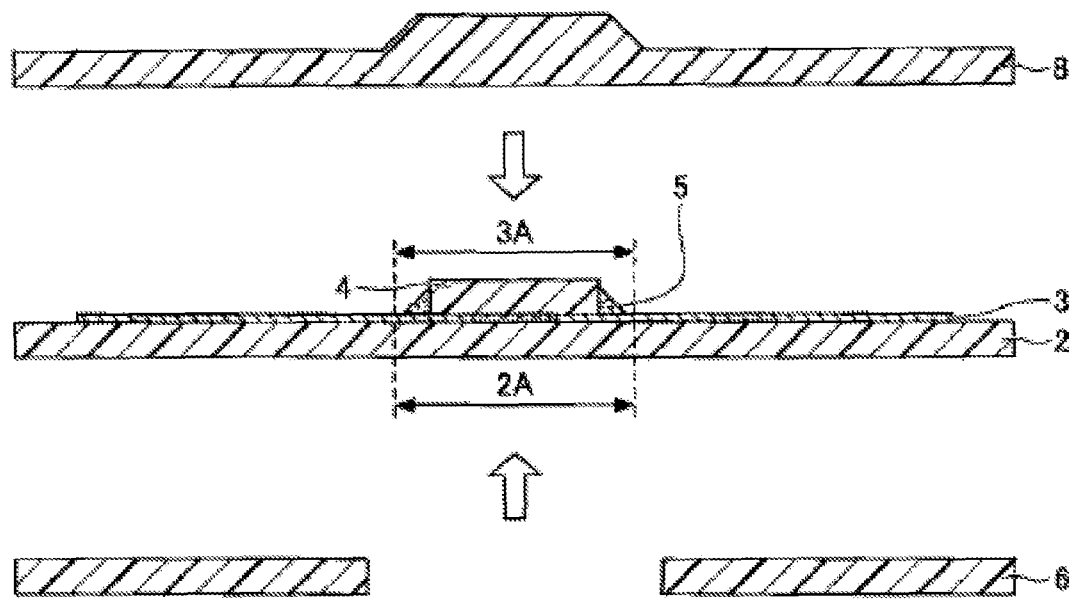
FIG. 9 is a cross-sectional view illustrating an example of a manufacturing process of the RFID tag in the second embodiment.

First, as illustrated in FIG. 9, a structure is provided which includes the antenna 3 formed on the top surface of the substrate 2, the IC chip 4 electrically coupled to the antenna 3, and the adhesive 5 to be applied to the first area 3A on the top surface of the antenna 3 to fix the IC chip 4 and the antenna 3 to each other. Then, the first laminate layer 6 having the opening 6A is formed on the bottom surface of the structure, and the second laminate layer 8 is formed on the top surface of the structure.

Figure 10:
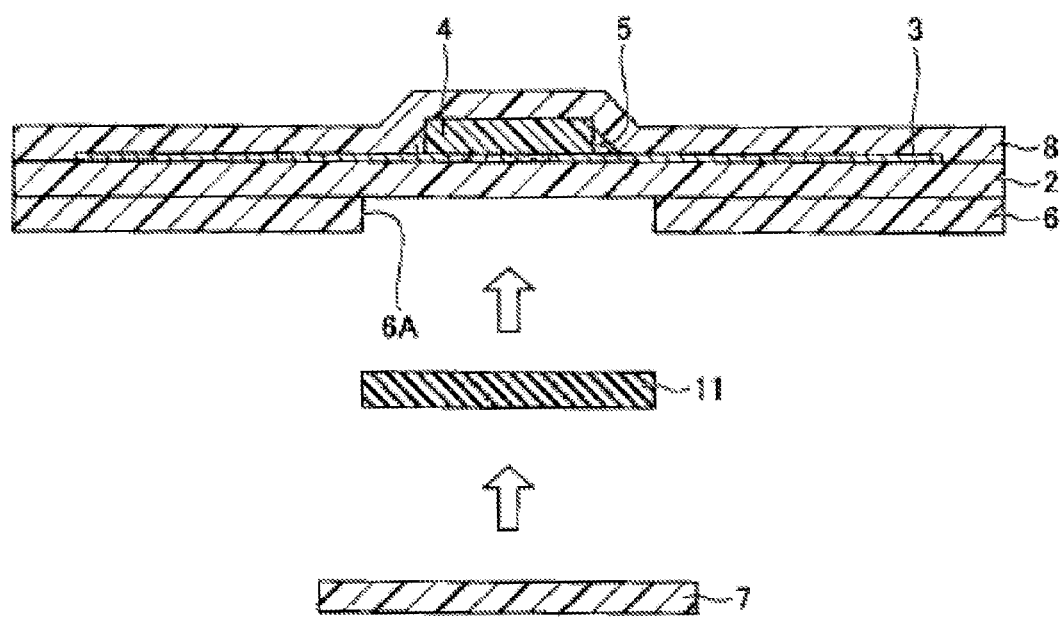
FIG. 10 is a cross-sectional view illustrating the example of the manufacturing processing of the RFID tag in the second embodiment.

Next, as illustrated in FIG. 10, the opening 6A of the first laminate layer 6 is filled with the rubber 11, and the first protecting layer 7 is formed on the bottom surface of the first laminate layer 6 so as to cover the rubber 11. Here, the first protecting layer 7 has the larger planar area than that of the second area 2A.

Figure 11:
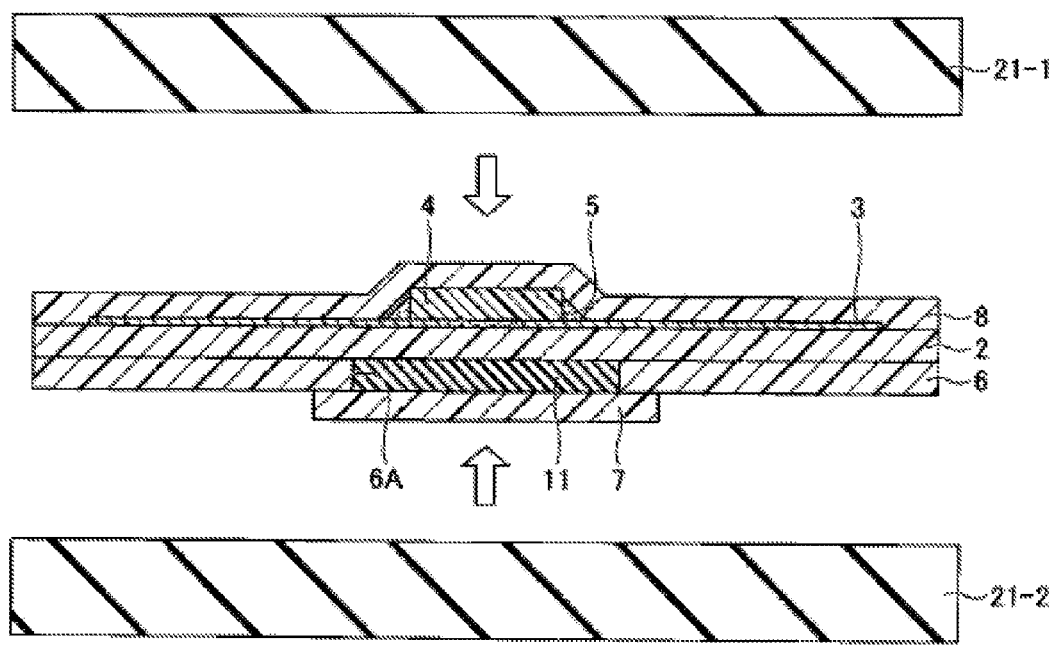
FIG. 11 is a cross-sectional view illustrating the example of the manufacturing processing of the RFID tag in the second embodiment.

Next, as illustrated in FIG. 11, the structure formed by the processes of FIGS. 9 and 10 is placed and pressed between an upper exterior material 21-1 and a lower exterior material 21-2. The upper exterior material 21-1 and the lower exterior material 21-2 are formed of, for example, a rubber, but the material thereof is not specifically limited as long as the material is an elastic material having, for example, a pressure resistance, a heat resistance, and a water resistance.

Figure 12:
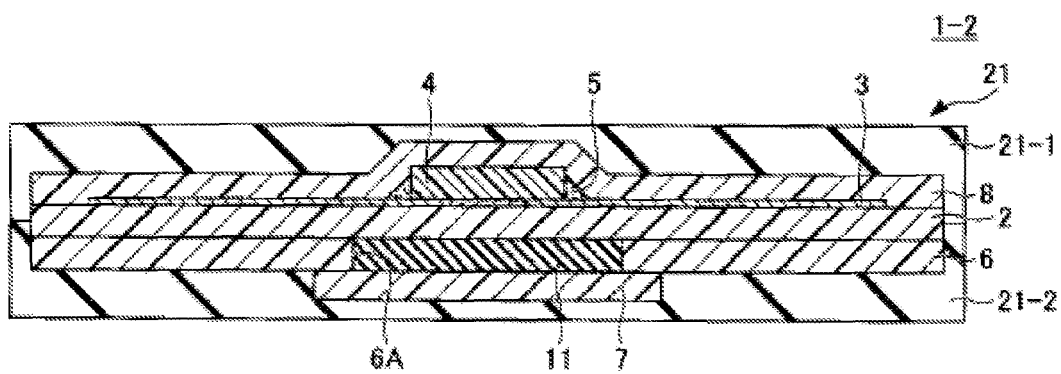
FIG. 12 is a cross-sectional view illustrating the example of the manufacturing processing of the RFID tag in the second embodiment.

Accordingly, as illustrated in FIG. 12, the structure formed by the processes of FIGS. 9 and 10 is manufactured into the RFID tag 1-2 which is sealed by an exterior member 21 formed by the upper exterior member 21-1 and the lower exterior member 21-2.

Next, descriptions will be made on a deformation of an RFID tag when a bending stress is applied to the RFID tag, with reference to FIGS. 13 to 18.

Figure 13:
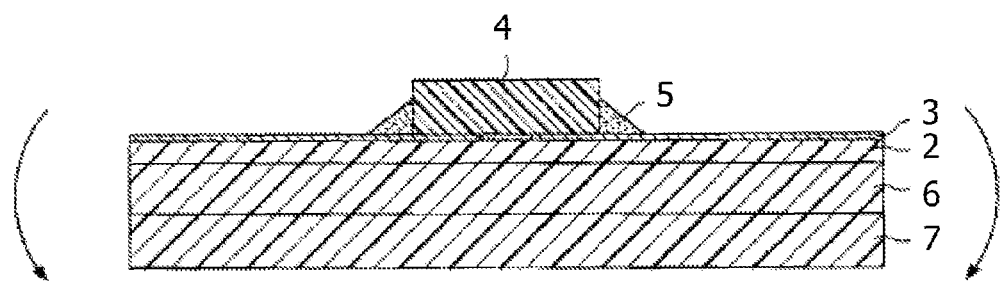
FIG. 13 is a cross-sectional view illustrating a part of an RFID tag in a comparative example.
Figure 14:
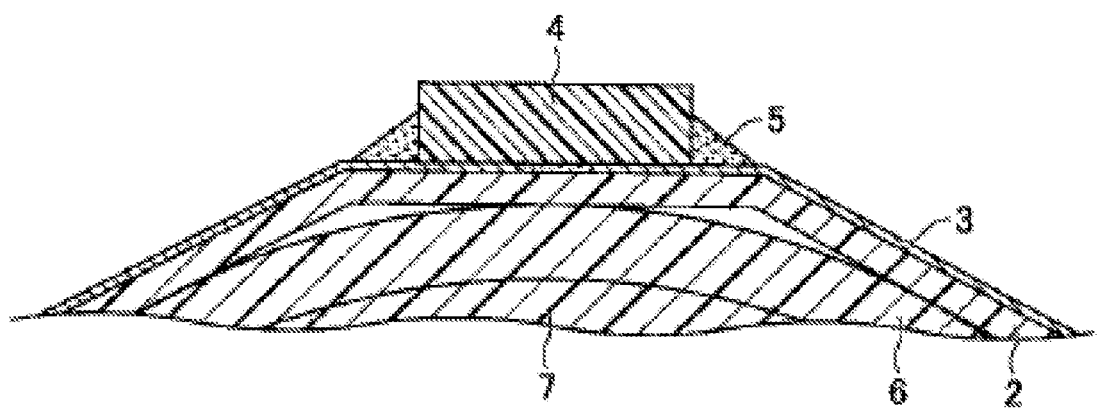
FIG. 14 is a cross-sectional view illustrating a state in which a bending stress is applied to the RFID tag in the comparative example.

FIG. 13 is a cross-sectional view illustrating a part of an RFID tag in a comparative example. FIG. 14 is a cross-sectional view illustrating a state in which a bending stress is applied to the RFID tag in the comparative example. In FIGS. 13 and 14, components which are identical to those in FIG. 1 will be denoted by the same reference numerals as used in FIG. 1, and descriptions thereof will be omitted. In this comparative example, the first laminate layer 6 is also formed within the second area 2A, which corresponds to the first area 3A, on the bottom surface of the substrate 2. That is, the first laminate layer 6 is not formed with an opening like the opening 6A illustrated in FIG. 1. Hence, when a bending stress is applied to the RFID tag in the direction indicated by the arrows in FIG. 13, a deformation of the first protecting layer 7 affects the first laminate layer 6 placed directly above the first protecting layer 7 so as to push up the portion of the first area 3A and deform the RFID tag as illustrated in FIG. 14. As a result of the deformation of the RFID tag, a large tensile stress causing the breakage of the antenna 3 at the edge of the first area 3A is easily applied to the surface of the antenna 3 so that the antenna 3 is easily broken.

Figure 15:
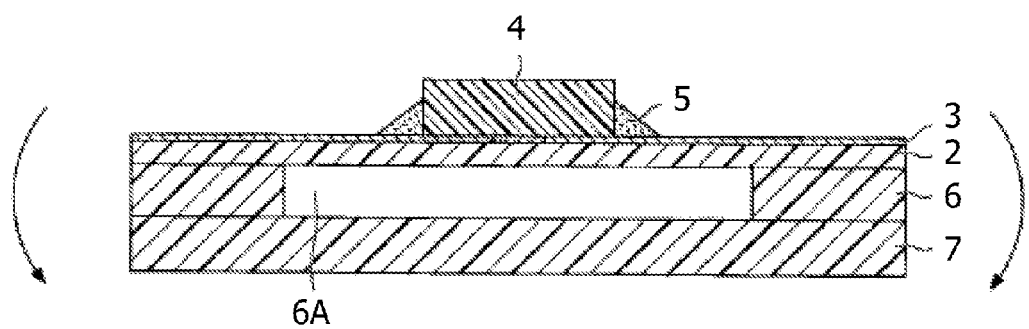
FIG. 15 is a cross-sectional view illustrating a part of the RFID tag in the first embodiment.
Figure 16:
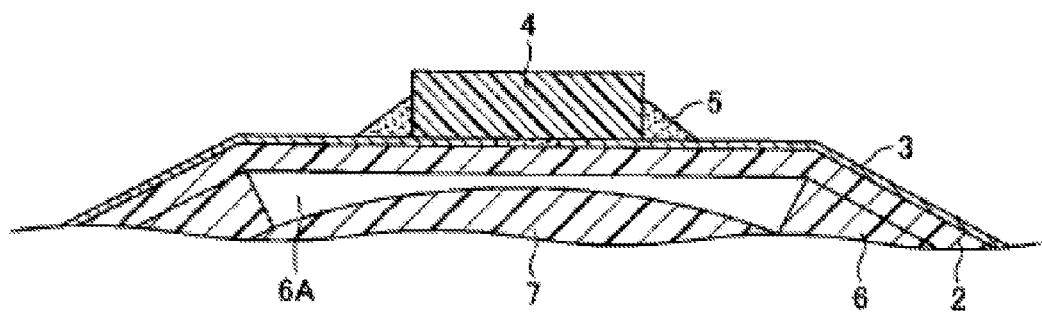
FIG. 16 is a cross-sectional view illustrating a state in which a bending stress is applied to the RFID tag in the first embodiment.

FIG. 15 is a cross-sectional view illustrating a part of the RFID tag in the first embodiment. FIG. 16 is a cross-sectional view illustrating a state in which a bending stress is applied to the RFID tag in the first embodiment. In FIGS. 15 and 16, components which are identical to those in FIG. 1 will be denoted by the same reference numerals as used in FIG. 1, and descriptions thereof will be omitted. In this example, the opening 6A is formed in the first laminate layer 6 within the second area 2A, which corresponds to the first area 3A, on the bottom surface of the substrate 2. Hence, when a bending stress is applied to the RFID tag in the direction indicated by the arrows in FIG. 15, the deformation of the first protecting layer 7 is absorbed by the opening 6A of the first laminate layer 6 placed directly above the first protecting layer 7. Thus, the force to push up the portion of the first area 3A is suppressed, compared to the comparative example of FIG. 14, so that the RFID tag is deformed as illustrated in FIG. 16. In the case of the deformation of the RFID tag, the large tensile stress causing the breakage of the antenna 3 at the edge of the first area 3A is difficult to be applied to the surface of the antenna 3 so that it becomes difficult for the antenna 3 to be broken at the edge of the first area 3A.

Figure 17:
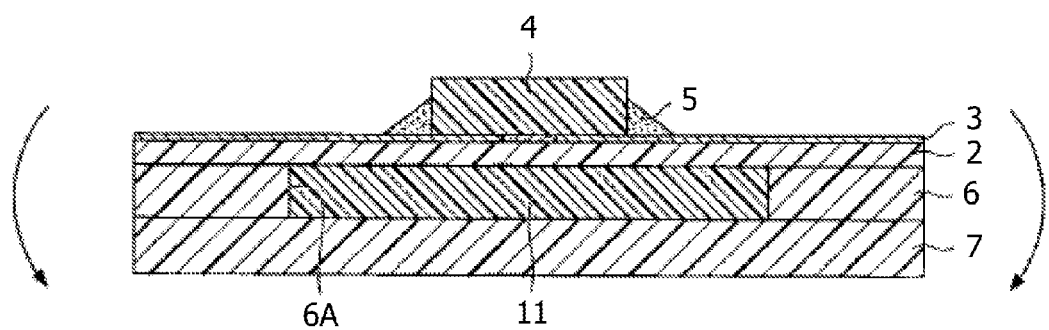
FIG. 17 is a cross-sectional view illustrating a part of the RFID tag in the second embodiment.
Figure 18:
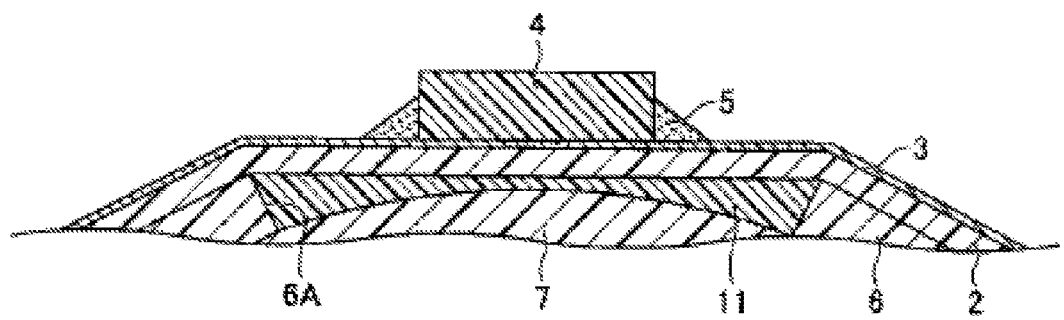
FIG. 18 is a cross-sectional view illustrating a state in which a bending stress is applied to the RFID tag in the second embodiment.

FIG. 17 is a cross-sectional view illustrating a part of the RFID tag in the second embodiment. FIG. 18 is a cross-sectional view illustrating a state in which a bending stress is applied to the RFID tag in the second embodiment. In FIGS. 17 and 18, components which are identical to those in FIG. 2 will be denoted by the same reference numerals as used in FIG. 2, and descriptions thereof will be omitted. In this example, within the second area 2A, which corresponds to the first area 3A, on the bottom surface of the substrate 2, the opening 6A of the first laminate layer 6 is filled with the rubber 11. Hence, when a bending stress is applied to the RFID tag in the direction indicated by the arrows in FIG. 17, the deformation of the first protecting layer 7 is absorbed by the rubber 11 within the opening 6A of the first laminate layer 6 placed directly above the first protecting layer 7. Thus, the force to push up the portion of the first area 3A is suppressed, compared to the comparative example of FIG. 14, so that the RFID tag is deformed as illustrated in FIG. 18. In the case of the deformation of the RFID tag, the large tensile stress causing the breakage of the antenna 3 at the edge of the first area 3A is difficult to be applied to the surface of the antenna 3 so that it becomes difficult for the antenna 3 to be broken at the edge of the first area 3A.

Figure 19:
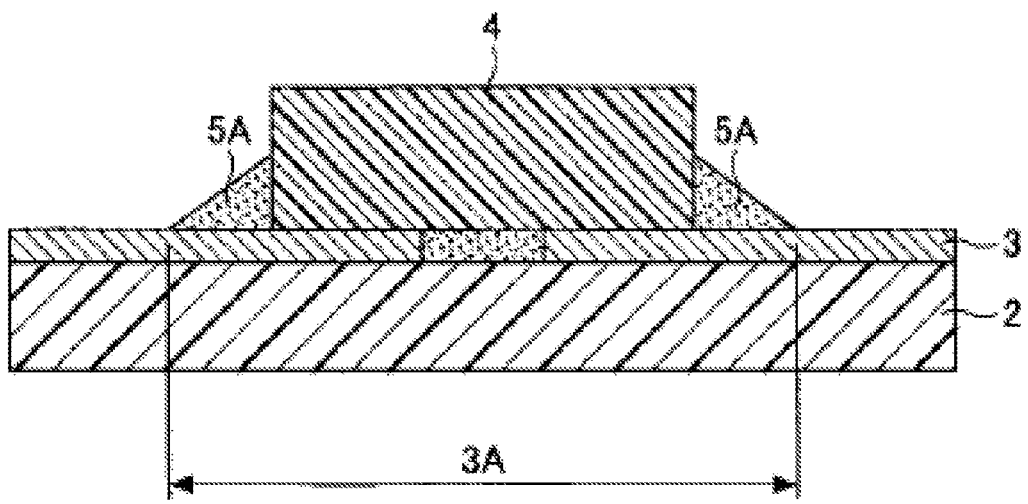
FIG. 19 is a cross-sectional view illustrating an example of an adhesion area of an IC chip.

FIG. 19 is a cross-sectional view illustrating an example of an adhesion area of an IC chip. In FIG. 19, components which are identical to those in FIG. 1 will be denoted by the same reference numerals as used in FIG. 1, and descriptions thereof will be omitted. Since the adhesive 5 is applied to the first area (adhesion area) 3A on the antenna 3 to fix the IC chip 4 and the antenna 3 to each other, the portion of the first area 3A of the structure illustrated in FIG. 19 is hard and is hardly bent, compared to the substrate 2 or the first laminate layer 6 (not illustrated). Hence, in the case of the comparative example illustrated in FIGS. 13 and 14, when the first laminate layer 6 below the first area 3A is deformed by the deformation of the first protecting layer 7, the tensile stress is applied to the surface of the antenna 3 so that the antenna 3 is easily broken at a filled portion 5A of the adhesive 5 that fixes the IC chip 4 to the antenna 3, i.e., at the edge of the first area 3A.

In contrast, in the example illustrated in FIGS. 15 and 16, even when the first protecting layer 7 below the first area 3A is deformed, the opening 6A of the first laminate layer 6 absorbs the deformation of the first protecting layer 7 and the first laminate layer 6. As a result, the tensile stress is difficult to be applied to the surface of the antenna 3 so that it becomes difficult for the antenna 3 to be broken at the filled portion 5A of the adhesive 5 that fixes the IC chip 4 to the antenna 3, i.e., at the edge of the first area 3A.

In addition, in the example illustrated in FIGS. 17 and 18, even when the first protecting layer 7 below the first area 3A is deformed, the rubber 11 within the opening 6A of the first laminate layer 6 absorbs the deformation of the first protecting layer 7 and the first laminate layer 6. As a result, the tensile stress is difficult to be applied to the surface of the antenna 3 so that it becomes difficult for the antenna 3 to be broken at the filled portion 5A of the adhesive 5 that fixes the IC chip 4 to the antenna 3, i.e., at the edge of the first area 3A.

FIG. 20 is a perspective view illustrating a state in which a tensile stress is applied to a surface of an antenna at an edge of the adhesion area as a result of a deformation of an RFID tag. In FIG. 20, components which are identical to those in FIG. 1 will be denoted by the same reference numerals as used in FIG. 1, and descriptions thereof will be omitted. As described above, the opening 6A is formed in the first laminate layer 6 or the opening 6A is filled with the rubber 33 so that even when the first protecting layer 7 below the first area 3A is deformed, the opening 6A of the first laminate layer 6 or the rubber 11 within the opening 6A absorbs the deformation of the first protecting layer 7 and the first laminate layer 6. Hence, the large tensile stress causing the breakage of the antenna 3, at the filled portion 5A of the adhesive 5 that fixes the IC chip 4 to the antenna 3 (see, e.g., FIG. 19), i.e., at the edge 3B of the first area 3A, is difficult to be applied to the surface of the antenna 3 so that it becomes difficult for the antenna 3 to be broken. That is, even when the first protecting layer 7 below the first area 3A is deformed, bending of the antenna 3 and the substrate 2 occurs only within the area 31 surrounded by a dashed line in FIG. 20, and the bending radius of the antenna 3 and the substrate 2 is not large so that it is difficult for the tensile stress to be applied to the surface of the antenna 3 to cause the breakage of the antenna 3.

When the bending radius of a neutral line of the structure formed by the substrate 2 and the antenna 3 (i.e., an imaginary line passing through the half thickness portion of the structure) is R1, the bending radius of the surface of the antenna 3 (the top surface in FIG. 20) is R2, the Young's modulus of the antenna 3 is E, the angle formed between the bent portion of the structure and the center of the bending radius of the bent portion is θ, and ΔR=R2−R1 is a constant value, the tensile stress σ applied to the surface of the antenna 3 may be represented as σ=E{(R2−R1)θ/R1θ}=E (ΔR/R1). Hence, it may be understood that the tensile stress σ applied to the surface of the antenna 3 decreases as the bending radius R1 of the neutral line increases.

According to each of the above-described embodiments, even when the RFID tag is deformed, the breakage of the antenna at the edge of the adhesive on the substrate may be suppressed. Hence, even when the RFID tag is used in a harsh use environment where a large load enough to deform the RFID tag is applied from the outside, it is possible to prevent the lifetime of the RFID tag from being reduced due to the breakage of the antenna.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio frequency identification (RFID) tag comprising:
   a substrate;
   an antenna formed on a first surface of the substrate;
   an IC chip electrically coupled to the antenna;
   an adhesive applied to a first area of the substrate to fix the IC chip and the antenna to each other; and
   a first laminate layer formed on a second surface of the substrate opposite to the first surface thereof,
   wherein at least a part of the first laminate layer is missing within a second area, which corresponds to the first area, on the second surface.

2. The RFID tag according to claim 1, wherein within the second area, the first laminate layer does not exist, and an opening is formed.

3. The RFID tag according to claim 1, further comprising an elastic material filling in a portion where the first laminate layer is missing within the second area.

4. The RFID tag according to claim 1, wherein a cross-sectional shape of the IC chip is a rectangle, and in first and second directions along two adjacent sides of the rectangle, a length of the second area in the first direction is equal to or longer than a length of the first area in the first direction, and a width of the second area in the second direction is equal to or longer than a width of the first area in the second direction.

5. The RFID tag according to claim 1, further comprising a first protecting layer having a larger planar area than a planar area of the second area and formed on a surface of the first laminate layer opposite to the substrate to cover the second area.

6. The RFID tag according to claim 5, wherein the first protecting layer is thicker than the first laminate layer.

7. The RFID tag according to claim 1, further comprising:
   a second laminate layer formed on the first surface of the substrate to cover the antenna and the IC chip; and
   a second protecting layer having a larger planar area than a planar area of the first area and formed over the second laminate layer to cover the first area.

8. The RFID tag according to claim 7, wherein the second protecting layer is thicker than the second laminate layer.

9. The RFID tag according to claim 7, wherein the second laminate layer is thicker than the first laminate layer.

10. The RFID tag according to claim 7, wherein the second laminate layer includes a plurality of laminate layers.

11. The RFID tag according to claim 1, wherein the first laminate layer includes a plurality of laminate layers.

12. The RFID tag according to claim 1, wherein the substrate and the first laminate layer are formed of the same material having elasticity.

13. The RFID tag according to claim 1, wherein the substrate and the first laminate layer are formed of materials having different elasticity from each other.

14. The RFID tag according to claim 1, further comprising an exterior material having elasticity to seal the substrate, the antenna, the IC chip, and the first laminate layer.

\* \* \* \* \*